INVENTOR.
YE-SHIH LIN

United States Patent Office 3,753,897
Patented Aug. 21, 1973

3,753,897
SEWAGE TREATMENT METHOD AND
APPARATUS
Ye-Shid Lin, and Cheng F. Chang, both of 213 W.
Scenic Drive, Monrovia, Calif. 91016
Filed Mar. 16, 1971, Ser. No. 124,790
Int. Cl. C02c 1/16, 1/08
U.S. Cl. 210—5
10 Claims

ABSTRACT OF THE DISCLOSURE

A sewage treatment package plant receives incoming raw sewage and purifies it by performing an activated sludge process thereon. Oxygen for re-aeration of sludge in the stabilization and digestion stages of the process is supplied directly from aerated sewage in the aeration stage. The plant is of unitary structure and includes partition means to subdivide the interior into separate aeration, stabilization and sedimentation chambers with a separate digestion cavity being defined beneath the stabilization chamber. The sedimentation chamber has a volume sufficiently large to fully absorb the effects of shock loadings. Means are included for directing aerated sewage directly from the aeration chamber into the stabilization chamber and digestion cavity for re-aeration of the sludge.

BACKGROUND OF THE INVENTION

Sewage treatment has been adapted to small population centers, not having conventional sewage systems, through the use of the "package plant." Sewage treatment package plants are generally of unitary construction and are very compact and versatile. They are mostly used as the sewage treatment and purification system for individual isolated dwellings.

In the early 1950's, it was recognized that a variant of the basic activated sludge process, generally termed "extended aeration," could be performed by a complete unit, or package, which required only the connection of influent, effluent, and power lines at the installation site to provide a high degree of waste treatment.

The extended aeration process performed by a package plant was found sufficient for up to 50,000 gallons per day (g.p.d.) of influent. The plant required, however, an aeration tank equal in volume to the design daily flow capacity of the plant. In the aeration tank, the incoming raw sewage, or influent, is aerated for a predetermined period of time during which the solid matter of the sewage, or sludge, is absorbed and partly oxidized by masses of bacteria which form into clumps called floc. The floc settles back down to the bottom of the plant as "settled sludge" and is then recirculated with incoming raw sewage. The process is thus continuous. Eventually, most of the solid matter of the sewage is aerobically digested, leaving a reasonably pure liquid effluent which is discharged from the plant. Any non-digested solids or excess sludge is periodically removed from the plant by mechanical means.

Because of the tankage requirement of the extended aeration process (aerator volume equal to the design daily flow), it did not prove economically feasible for larger flow rates in comparison with conventional treatment processes. However, the package plant concept proved so useful for lower flow rates that ways were sought to extend its range of economic application. To this end, the so-called "contact-stabilization" variation of the basic activated sludge process was investigated.

The contact-stabilization process has four basic stages: contact, sedimentation, stabilization, and digestion. Basically, raw sewage is introduced into a contact chamber or tank where it is aerated and mixed with "return sludge" from a stabilization tank. The sewage remains in the contact tank for about 15 to 30 minutes. During this time, the raw sewage and sludge undergo the usual chemical and bacteriological processes which convert most of the solids in the sewage to a suspension of liquid and activated sludge floc.

After the contact period, an average particle of sewage passes into a sedimentation tank or chamber where the floc settles out of the liquid suspension and is directed back into the stabilization tank where it stays for about 5 hours. In that tank, it is aerated and agitated. After the five hour period, a portion of the floc is returned as "return sludge" to the contact tank and the process repeats itself. The heavier sludge settles into a digestion tank or chamber, usually located beneath the stabilazation tank, where it is aerobically digested. Periodically, the non-digested inorganic particles are removed from the digester. Meanwhile, liquid remaining in the sedimentation tank after the floc has settled out is discharged from the system as a purified effluent. It may be mixed with chlorine or other purifying agents before actual discharge.

In investigation the contact-stabilization process for package plants, it was found that it permits much higher organic loadings. However, the very short contact period (15–30 min.) in combination with the substantial shock loadings inherent in such package plants, resulted in an unstable and unreliable treatment system. Furthermore, the relative short 5 hour stabilization period resulted in a high solids accumulation rate and an attendant solids disposal problem. Thus, contact-stabilization package plants, although developed (see U.S. Pat. No. 2,901,114 to Smith), never really caught on commercially.

To overcome the above-mentioned difficulties, another variation of the basic activated sludge process was developed, i.e., the "two-stage aeration" process. The stages of this process are essentially identical to the contact-stabilization process. What differs is that the aeration (contact) and re-aeration (stabilization) time periods are longer. For instance, the contact period is about 3 hours, which is based on the mean influent flow rate; whereas the stabilization period is 7½ to 8 hours. These longer time periods provide efficient sewage purification during shock loadings and, additionally, substantially reduce solids accumulation.

An effort to exploit this new process in package plants has not proved entirely successful. For instance, systems such as that described in the above-cited Smith patent have a single oxygen supply source (compressed air) supplying oxygen directly into the stabilization and digestion chambers as well as the aeration chamber. Such facilities complicate the plant and add to the cost.

Most of the package plants available today, whether used to perform a conventional activated sludge process or the more modern contact-stabilization or two-stage aeration processes, suffer from major disadvantages. These plants, in using compressed air systems, require skilled personnel to operate them. Quite frequently, the air compressor breaks down and must be repaired or replaced thereby rendering the plant inoperative. Additionally, the air diffuser used in the system often becomes clogged with undigested grease and fats thereby causing inefficient oxygenation, incomplete fat digestion, and a poor effluent quality. Furthermore, undigested fats quite often find their way into the settling or sedimentation chamber of the plant prior to complete aerobic digestion thereof. This, of course, substantially detracts from the quality of the effluent.

It is desirable, therefore, to provide a sewage treatment package plant devoid of the above-described difficulties and which, if desired, may be readily designed to carry out a two-stage aeration process in addition to the conventional and contact-stabilization activated sludge processes.

SUMMARY OF THE INVENTION

The present invention fulfills the above desirability in a simple, rugged and effective package plant. The plant may be specifically designed to perform any desired activated sludge process, including, but not limited to, the advanced "two-stage aeration" process.

The plant does not rely on compressed air systems for aeration, but rather on the mixture of sewage with ambient air. This eliminates clogging problems. Also, the plant is designed to provide maximum aerobic digestion of grease and fat so that the effluent quality is particularly high.

Oxygen for re-aeration of sludge in the plant is supplied from the oxygen diffused into the sewage during the aeration stage of the process and not from an external source. No separate air supply conduits are necessary for re-aeration thereby cutting down the costs and complexity of the plant. Human supervision is thus reduced to a minimum.

Generally speaking, and in terms of apparatus, a package plant according to this invention comprises an outer container defining an enclosure therein. Partition means are included within the outer container for dividing the enclosure into separate aeration, stabilization, and sedimentation chambers a separate aerobic digestion cavity is defined beneath the stabilization chamber.

Means are included for directing raw sewage into the aeration chamber and for aerating it while therewithin. Means are also included for directing sludge from the stabilization chamber into the aeration chamber during aeration of raw sewage in the latter chamber. Additionally, means are included for directing the liquid suspension of activated sludge flocs, formed in the aeration chamber, into the sedimentation chamber where the sludge flocs settle out and are directed, by separate means, back into the stabilization chamber. A portion of this settled sludge is returned to the aeration chamber to re-mix with the influent, whereas the remainder heavier sludge and inorganic particles eventually settle into the digestion cavity. The inorganic particles are periodically removed from the digestion cavity and the heavier sludge is eventually aerobically digested. The liquid remaining in the sedimentation chamber, after the floc has settled out, is discharged by appropriate means from the plant as purified effluent.

In accordance with this invention, separate means are included in the above apparatus for directing aerated sewage directly from the aeration chamber into the stabilization chamber in order to re-aerate the sludge therein contained as well as the sludge settled into the digestion cavity. In other words, no separate air conduit means are needed as in package plants such as shown in the Smith patent.

In a further aspect of this invention, the means for directing the liquid suspension into the sedimentation chamber includes tube means communicating between the aeration and sedimentation chambers and situated well beneath the surface of the sewage so that the fats and grease floating on or near the liquid surface do not pass into the sedimentation chamber to spoil the quality of the effluent. Digestion of these fats is maxaimized since the fats, by lying on or near the liquid surface, are in intimate contact with the ambient air being mixed with the sewage.

In a still further aspect of this invention, the sedimentation chamber is defined between the partition means and the outer container. The partition means has a longitudinal extent sufficient to define a sedimentation chamber volume more than adequate to handle normally occurring shock loadings.

The present invention is also directed to an improved method of implementing the "contact-stabilization" or "two-stage aeration" variants of the basic activated sludge process. The method includes the addition of a step to whichever of these two processes is used. In accordance with this added step, aerated sewage is fed directly from the aeration stage into the stabilization and digestion stages to supply oxygen for re-aeration and aerobic digestion of the sludge being processed.

BRIEF DESCRIPTION OF THE DRAWING

These and other aspects and advantages of this invention are more clearly described with reference to the accompanying drawing wherein.

DESCRIPTION OF THE PREFERRED EMBODIMENT

Figure 1:
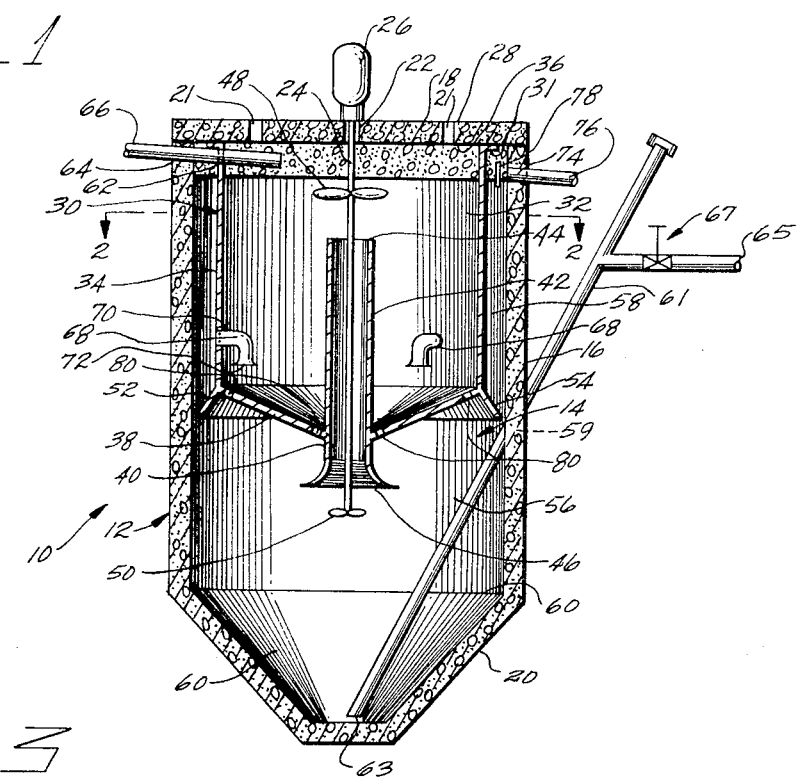
FIG. 1 is a side cross-sectional view of a packer plant of this invention.
Figure 2:
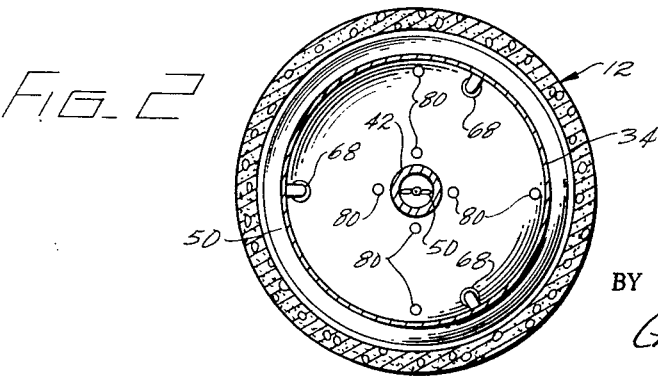
FIG. 2 is a cross-sectional view of the plant of FIG. 1 taken along lines 2—2.

A sewage treatment package plant 10 of this invention is shown in FIGS. 1 and 2. The plant is of unitary structure and is relatively compact and rugged and may be used as the sewage treatment facility for isolated dwellings, such as homes, schools, shopping centers, motels and the like.

Plant 10 is defined by an outer container 12 of generally circular cylindrical configuration, although the container might have a square, rectangular, triangular, or any other shaped cross-sectional configuration, if desired. Container 12 is preferably fabricated of concrete, steel, plastic or other non-corrosive material. The container has an internal enclosure 14 which is bounded by a container side wall 16, a container top 18, and a container hopper-shaped bottom floor 20 which is formed at and closes the lower end of the side walls.

Top 18 is flat and fully encloses the upper end of sidewall 16. A circular aperture 22 is defined through the top and is designed to accommodate a drive shaft 24 of a conventional motor 26 mounted to the upper surface 28 of top 18. An additional pair of openings 21 are defined through the top to let air into enclosure 14 so that it may be mixed with sewage in a manner described below.

An internal container 30 is disposed within enclosure 14 and has a side wall 34 which is mounted by brackets 31 at its upper extent to a lower surface 36 of top 18. Container 30 defines an internal chamber 32 therein which shall hereinafter be referred to as the "aeration" chamber. Aeration chamber 32 is thus bounded at the top by top 18 and at its side by sidewall 34. It also is bounded at the bottom by a hopper-shaped bottom floor 38 closing the lower end of sidewall 34. Thus defined, aeration chamber 32 has the same general configuration as enclosure 14, but only smaller in overall volume. Such similarity of configuration, although preferred, is not required.

Bottom floor 38 of container 30 has a central opening 40 defined therethrough and in which is disposed an elongate draft tube 42. Tube 42 has opposing open ends 44 and 46. End 44 of tube 42 is disposed substantially in the center of aeration chamber 32 whereas end 46 of tube 42 is disposed without container 30 and adjacent floor 38. The lower end of tube 42 is funnel-shaped with the maximum transverse extent of the funnel defining open end 46.

Drive shaft 24 is disposed concentrically through tube 42 and has an aeration fan 48 mounted thereto without the tube and adjacent open end 44 of the tube. The precise position of fan 48 is important. It should be at a selected position above tube open end 44 and beneath the level of sewage in the tank so that the proper degree of turbulence and oxygen transfer is established during normal operation. An agitation fan 50 is mounted to shaft 24 at the lower end thereof which is positioned just beneath end 46 of tube 42. As will be explained in greater detail below, fan 48 operates to aerate sewage incoming into aeration chamber 32, whereas fan 50 operates to agitate the sewage present in that portion of enclosure 14 situated beneath inner container 30, such portion hereinafter referred to as "stabilization" chamber 56.

Container 30 includes a downward sloping annular apron 52 extending outwardly and downwardly from the juncture of sidewall 34 and floor 38 to an annular outer edge closely adjacent outer container side wall 16. An annular passage 54 is thus defined between the outer end of apron 52 and sidewall 16. The effective area of passage 54 is substantially less than the mean cross-sectional area of the sedimentation chamber in a direction normal to the inner container side wall so that sludge settling onto apron 52 is swiftly carried down into the stabilization chamber through passage 54.

Container 30 serves as a partition means to subdivide enclosure 14 into separate chambers. More specifically, aeration chamber 32 is defined in the interior of container 30, stabilization chamber 56 is defined beneath container floor 38 with its upper boundary defined by such floor as well as apron 52 and its lower boundary defined adjacent the upper extent of bottom floor 20, and a settling or "sedimentation" chamber 58 is defined between the side walls of the inner and outer containers with its upper boundary defined at top 18 and its lower boundary defined at apron 52. A separate digestion cavity 60 is also defined beneath stabilization chamber 56 in the area bounded by bottom floor 20.

Side wall 34 of inner container 30 has an opening 62 defined therethrough adjacent top 18. Opening 62 has an effective area equal to, and is aligned with, an opening 64 defined through side wall 16 of outer container 12. A liquid sewage inlet tube 66 is disposed through both said openings to provide a passage for raw sewage influent to enter aeration chamber 32 from without the plant.

Three elbow tubes 68 each have one open end mated within a corresponding opening 70 defined in sidewall 34 of container 30. Another open end 72 of each elbow tube is located within the aeration chamber with each tube directed downwardly so that ends 72 face floor 38. These elbow tubes define a means for directing sewage from aeration chamber 32 into sedimentation chamber 58.

Another opening 74 is defined through sidewall 16 of container 12 adjacent top 18 and is preferably disposed opposite opening 64. A treated sewage outlet tube 76 is fitted through opening 74 to provide liquid flow communication out of the plant from the sedimentation chamber. Tube 76 is designed to direct purified effluent out of the plant. In this regard, the liquid sewage is fed into tube 76 by first passing a baffle 78 mounted within sedimentation chamber 58 adjacent the tube. More specifically, baffle 78 is a plate disposed parallel to sidewall 34 of container 30. The baffle acts to smooth the flow of the effluent to tube 76.

The relationship between tubes 68 and the liquid sewage surface is important. More specifically, it is important that tubes 68 be located substantially below the surface of the sewage in aeration chamber 32. This insures that the grease and fats in the sewage influent, which generally float near or on the surface, do not pass into sedimentation chamber 58 where it could emerge in the liquid effluent through tube 76. The grease and fats, remaining substantially on the surface, are aerobically digested thereby forming into activated sludge flocs which settle into the interior of chamber 32 for remixing with incoming raw sewage. The quality of effluent from plant 10, therefore, is quite high.

Yet another opening 59 is defined through sidewall 16 of container 12 to provide communication from digestion cavity 60 to without the plant through a withdrawal tube 61 disposed through opening 59. Tube 61 has an open inlet end 63 located within digestion cavity 60 adjacent the lower extremity of bottom floor 20. An open outlet end 65 of tube 61 is located without the plant and is regulated as to effective outlet area by a flow control valve 67. The tube serves as a means for removing excess sludge and inorganic non-digested solids from the digestion cavity.

An important feature of the present invention is the provision of a sedimentation chamber 58 having a volume adequate to accommodate the shock loadings inherent in small package plants, such as plant 10. The significantly large volume is defined primarily by the relatively long length of side wall 34 of inner container 30 relative to the elongate extent of sidewall 16 of outer container 12. Thus, even though the distance between sidewalls 16 and 34 is relatively small so as to provide desirable compactness and unitary design of the plant, a significantly large sedimentation chamber volume is nonetheless defined due to the long-walled inner container 30.

Another important aspect of this invention is the provision of a plurality of holes 80 through floor 38 of container 30. Holes 80 define a means for directing sewage directly from the aeration chamber into the stabilization chamber and digestion cavity. This eliminates the costly and wasteful use of the oxygen supplying means of the prior art, as above described.

In plant 10, oxygen for the stabilization and digestion stages of the activated sludge process carried out are supplied by the oxygen diffused into the aerated sewage in the aeration chamber; such aerated sewage having been fully aerated by being mixed, through operation of fan 48, with ambient air in the container. The need for a separate external source of oxygen for the stabilization and digestion stages is, therefore, eliminated.

Figure 3:
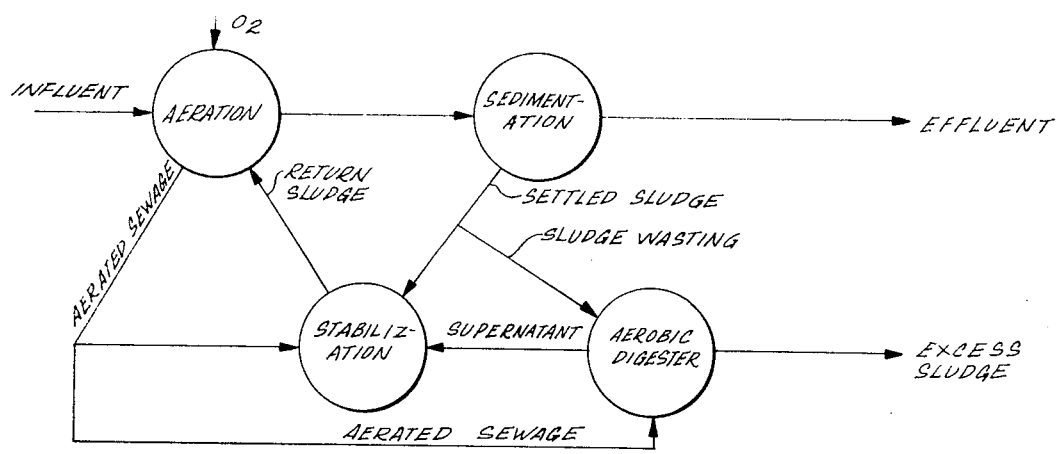
FIG. 3 is a schematic flow diagram of the improved activated sludge process of this invention.

The improved method of implementing an activated sludge process carried out by plant 10 is now described with reference to the schematic diagram of FIG. 3, in combination with FIGS. 1 and 2. For purposes of example, the method is shown as implementing a "two-stage aeration" activated sludge process. It should be noted, however, that plant 10 may be dimensioned to perform other types of activated sludge processes as well for which the present method may be equally applicable.

Before raw sewage influent is actually introduced into aeration chamber 32, which is the start of the process, it first passes through a grinder or comminutor (not shown) which reduces the solid matter to a small size. It is in this form that the sewage is fed into aeration chamber 32 via inlet tube 66.

An average particle of sewage influent remains in aeration chamber 32 for about 3 hours (during a two-stage aeration process) where it is mixed with return sludge being fed into chamber 32 through draft tube 42 from stabilization chamber 56. The return sludge and raw sewage mixture is aerated by the rotation of fan 48. From what has been stated above, a suspension of activated sludge floc and liquid is formed.

Fats, grease and other floatables in the liquid influent take longer to digest than the carbohydrates and proteins therein. These fats are trapped on and near the surface of the sewage in the aeration chamber and are eventually fully digested. As has been stated before, digestion occurs relative rapidly since the fats are in intimate contact with ambient air as the sewage is agitated by aeration fan 48.

After the aeration period, the liquid suspension passes through elbow tubes 68 into sedimentation chamber 58 where the heavier floc settles out of the suspension and onto apron 52 and is then swiftly channeled down into stabilization chamber 56 through annular passage 54. The settled floc in the stabilization chamber is maintained substantially in a state of suspension due to the turbulence generated by fan 50. The heavier floc and solid inorganic mater nonetheless setle into digestion cavity 60.

An average particle of sewage remains in stabilization chamber 56 for about 7½ hours, during a "two-stage aeration" process, where it is continuously agitated and re-aerated. Such average particle then returns to the aeration chamber via tube 42 where the process is repeated. The heavier sludge, which settles into digestion cavity 60 is also reaerated. An average particle in cavity 60 remains there for a period of time (two-stage aeration) where it is either fully aerobically digested or removed therefrom through withdrawal tube 61. Additionally, a supernatant is constantly formed at the top of digestion cavity and is returned to stabilization chamber 56 for further stabilization and re-aeration.

Depending upon plant capacity and the specific process carried out, anywhere from 25% to 100% of floc settling into stabilization chamber 56 is returned to aeration chamber 32; whereas most of the remaining settled floc is digested while either in the stabilization chamber or digestion cavity. Whatever is left in cavity 60 is usually inorganic material or undigested sludge which are periodically removed from the plant via tube 61.

Returning now to sedimentation chamber 58, once the floc settles out of the suspension and onto apron 52, a generally pure and clean liquid remains. This liquid is led past baffle 78 and through tube 76 where it is discharged from the plant as a purified effluent. It should be noted that, if desired, a segment of sedimentation chamber adjacent outlet tube 76 may be used as a chlorinating station to further purify the liquid effluent.

As pointed out above, an important feature of the invention is the ability of the plant to supply sufficient oxygen to the stabilization chamber and digestion cavity for proper re-aeration therein. An adequate amount of oxygen is supplied through the medium of the oxygen diffused into aerated sewage from aeration chamber 32, as supplied into the stabilization chamber through holes 80 in floor 38 of inner container 30. No external source of oxygen is required for stabilization.

The method of this invention relates to implementing whichever activated sludge process is performed by plant 10. For instance, as applied to the "contact-stabilization" or "two-stage aeration" processes, the steps of such processes continue to be carried out, i.e., (1) directing raw sewage into the aeration chamber, (2) aerating the raw sewage while in the aerating chamber, (3) drawing sludge out of the stabilization chamber and into the aeration chamber during aeration of the raw sewage so that the sludge may mix with the sewage to bacteriologically convert the solids of the sewage into a liquid suspension of activated sludge flocs, (4) directing the suspension into the sedimentation chamber to separate out the sludge flocs, (5) directing the separated sludge back into the stabilization chamber where a portion thereof is returned to the aeration chamber and a portion thereof settles into the digestion cavity, and (6) directing the liquid left in the sedimentation chamber out of the plant as purified effluent.

In accordance with the method of this invention, an additional step is included. Specifically, aerated sewage is directed from the aeration chamber directly into the stabilization chamber where the oxygen concentrated therein sufficiently re-aerates the sludge in the stabilization chamber and digestion cavity.

Although this invention has been described with regard to a specific embodiment (FIGS. 1 and 2) and process (FIG. 3), it is noted that obvious modifications and alterations may be made thereto without departing from the spirit of this invention as defined in the following claims.

What is claimed is:

1. A method of sewage treatment in a package plant having an outer container and a partition means included within the container for defining therein separate aeration, stabilization and sedimentation chambers, a digestion cavity being defined beneath the stabilization chamber, the method comprising the steps of:

(a) directing raw sewage into the aeration chamber through the outer container;

(b) aerating the raw sewage while in the aeration chamber;

(c) drawing settled sludge out of the stabilization chamber and into the aeration chamber during aeration of the raw sewage so that the sludge may mix with the sewage to bacteriologically convert the solids of the sewage into a liquid suspension of activated sludge flocs;

(d) directing the suspension into the sedimentation chamber to separate out the sludge from the liquid;

(e) directing the separated sludge back into the stabilization chamber where a portion thereof is returned to the aeration chamber and a portion thereof settles into the digestion cavity;

(f) directing aerated sewage directly from the aeration chamber into the stabilization chamber in order to re-aerate the sludge contained therein as well as the sludge settled into the digestion cavity; and (g) directing the liquid left in the sedimentation chamber out of the plant through the outer container.

2. The process of claim 1, further comprising the step of periodically removing excess sludge from the digestion cavity.

3. The process of claim 1, further comprising the step of providing the sedimentation chamber with a volume sufficient to handle the shock loadings inherent in sewage treatment package plants.

4. The process of claim 1, wherein the step of directing the suspension into the sedimentation chamber includes directing the suspension out of the aeration chamber from a point situated substantially below the surface of the sewage in the aeration chamber so that undigested grease and fats do not enter the sedimentation chamber.

5. A sewage treatment apparatus of unitary and compact structure for receiving raw sewage and performing an activated sludge process thereon comprising:

(a) an outer container defining an enclosure therewith;

(b) means defining an inner aeration chamber inside the outer container, the inner chamber being positioned adjacent the top of the container;

(c) means separating the interior of the container into two additional chambers, a sedimentation chamber surrounding the inner chamber and a stabilization chamber below the aeration and sedimentation chambers;

(d) means defining a vertical passage opening at its lower end in the stabilization chamber and opening at its upper end adjacent the top of the inner chamber;

(e) means defining openings between the inner chamber and the stabilization chamber;

(f) means defining passages between the inner chamber and the surrounding sedimentation chamber;

(g) means defining openings to the atmosphere from the inner chamber;

(h) means defining an opening between the bottom of the sedimentation chamber and the top of the stabilization chamber;

(i) means directing raw sewage directly into the inner chamber;

(j) an outlet pipe extending into the sedimentation chamber adjacent the top of the container to maintain the level of liquid in the container at a predetermined level;

(k) means for agitating the sewage in the inner chamber to introduce air into the liquid; and (l) pump means for circulating sewage from the aeration chamber into the stabilization chamber through said opening defining means and back into the areation chamber through said vertical passage.

6. The apparatus of claim 5 wherein the means for defining passages from the inner chamber into the sedimentation chamber includes tube means communicating between the aeration and sedimentation chambers and being situated substantially below the surface of sewage in the aeration chamber so that undigested fats do not enter the sedimentation chamber.

7. The apparatus of claim 5, further comprising means for removing excess sludge from the bottom of the container.

8. The apparatus of claim 5, wherein the means defining an opening from the sedimentation chamber into the stabilization chamber includes an annular apron integral with the means defining the inner chamber, the apron defining an annular passage between the outer edge of the apron and the wall of the outer container, the annular passage providing liquid flow communication between the sedimentation and stabilization chambers, the effective area of the passage being substantially less than the mean cross-sectional area of the sedimentation chamber in a direction normal to the inner container side wall.

9. Apparatus of claim 5 wherein the agitation means and pump means comprise a common drive source.

10. Apparatus of claim 9 wherein the common drive source includes a motor having a shaft extending through said vertical passage, impeller means mounted on the shaft below the passage for urging fluid flow upwardly through the passage, and fan means mounted on the shaft slightly below said predetermined liquid level for drawing air into the liquid.

References Cited
UNITED STATES PATENTS

| | | | |
|---|---|---|---|
| 3,298,526 | 1/1967 | Valdespino et al. | 210—256 X |
| 2,573,941 | 11/1951 | Walker et al. | 210—208 X |
| 3,118,834 | 1/1964 | Southworth et al. | 210—256 X |
| 2,678,913 | 5/1954 | Kalinske | 210—208 |
| 2,901,114 | 8/1959 | Smith et al. | 210—15 X |

SAMIH N. ZAHARNA, Primary Examiner

T. G. WYSE, Assistant Examiner

U.S. Cl. X.R.

210—9, 15, 197, 208, 256

UNITED STATES PATENT OFFICE
CERTIFICATE OF CORRECTION

Patent No. 3,753,897     Dated    August 21, 1973

Inventor(s)  YE-SHIH LIN

It is certified that error appears in the above-identified patent and that said Letters Patent are hereby corrected as shown below:

Drawing Heading, delete "ET AL".
Column 1, line 4, change "Ye-Shid Lin" to --Ye-Shih Lin-- delete "Cheng F. Chang".

Column 3, line 65, change "maxaimized" to --maximized--.

Column 4, line 13, change "packer" to --package--.

Column 6, line 73, change "mater" to --matter--.

Signed and sealed this 1st day of January 1974.

(SEAL)
Attest:

EDWARD M. FLETCHER, JR.        RENE D. TEGTMEYER
Attesting Officer              Acting Commissioner of Patents